(12) United States Patent
Kolganov et al.

(10) Patent No.: US 12,143,371 B2
(45) Date of Patent: Nov. 12, 2024

(54) SECURE SYNCHRONIZATION OF DATA

(71) Applicant: UAB 360 IT, Vilnius (LT)

(72) Inventors: Konstantin Kolganov, Kaunas (LT);
Tomas Smalakys, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/893,171

(22) Filed: Aug. 23, 2022

(65) Prior Publication Data
US 2024/0064131 A1    Feb. 22, 2024

Related U.S. Application Data

(63) Continuation of application No. 17/892,045, filed on Aug. 19, 2022.

(51) Int. Cl.
*H04L 9/40* (2022.01)
*H04L 9/14* (2006.01)

(52) U.S. Cl.
CPC ............ *H04L 63/0435* (2013.01); *H04L 9/14* (2013.01)

(58) Field of Classification Search
CPC ............................. H04L 63/0435; H04L 9/14
See application file for complete search history.

(56) References Cited

U.S. PATENT DOCUMENTS

| | | | |
|---|---|---|---|
| 9,306,741 B1 | 4/2016 | Brainard | |
| 9,397,984 B1* | 7/2016 | Hu | H04L 63/061 |
| 2002/0019932 A1* | 2/2002 | Toh | H04L 63/061 |
| | | | 713/155 |
| 2003/0147267 A1 | 8/2003 | Huttunen | |
| 2003/0204738 A1* | 10/2003 | Morgan | H04L 63/0853 |
| | | | 713/194 |
| 2004/0249902 A1* | 12/2004 | Tadayon | G06F 16/10 |
| | | | 709/207 |
| 2010/0248699 A1* | 9/2010 | Dumais | H04L 67/1095 |
| | | | 455/414.1 |
| 2013/0246813 A1 | 9/2013 | Mori et al. | |
| 2017/0142082 A1* | 5/2017 | Qian | G06F 21/62 |
| 2018/0063105 A1* | 3/2018 | Poon | H04L 63/123 |

* cited by examiner

*Primary Examiner* — Henry Tsang
(74) *Attorney, Agent, or Firm* — The Pattani Law Group

(57) ABSTRACT

A method including configuring, by an infrastructure device, a first user device to select an encryption key, from among a plurality of encryption keys available to the first user device, for encrypting a metadata key that is utilized to encrypt metadata associated with a file; receiving, by the infrastructure device from the first user device, an encrypted metadata key; transmitting, by the infrastructure device to a second user device, the encrypted metadata key; and configuring, by the infrastructure device, the second user device to select a decryption key, from among a plurality of decryption keys available to the second user device, for decrypting the encrypted metadata key, the decryption key being associated with the encryption key is disclosed. Various other aspects are contemplated.

20 Claims, 6 Drawing Sheets

400

410 — Configuring, by an infrastructure device, a first user device to select an encryption key, from among a plurality of encryption keys available to the first user device, for encrypting a metadata key that is utilized to encrypt metadata associated with a file 420 — Receiving, by the infrastructure device from the first user device, an encrypted metadata key 430 — Transmitting, by the infrastructure device to a second user device, the encrypted metadata key 440 — Configuring, by the infrastructure device, the second user device to select a decryption key, from among a plurality of decryption keys available to the second user device, for decrypting the encrypted metadata key, the decryption key being associated with the encryption key

SECURE SYNCHRONIZATION OF DATA

CROSS REFERENCE

This application is a continuation of U.S. Non-Provisional patent application Ser. No. 17/892,045 filed on Aug. 19, 2022, and titled "Secure Synchronization Of Data," the entire contents of which are incorporated herein by reference.

FIELD OF DISCLOSURE

Aspects of the present disclosure generally relate to use of computer hardware and/or software to manage data, and in particular to secure synchronization of data.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including encrypting, by a user device, a file based at least in part on utilizing a file symmetric key and a first encryption algorithm to determine a first-encrypted file; storing, by the user device, the first-encrypted file in a local memory; encrypting, by the user device, the file based at least in part on utilizing a synchronization key and a second encryption algorithm to determine a second-encrypted file, the second encryption algorithm being different from the first encryption algorithm; encrypting, by the user device, metadata associated with the file based at least in part on utilizing a metadata key to determine encrypted metadata; and transmitting, by the user device to a storage device, the second-encrypted file in association with the encrypted metadata.

In another aspect, the present disclosure contemplates a device comprising a memory and a processor communicatively coupled to the memory, the processor being configured to: encrypt a file based at least in part on utilizing a file symmetric key and a first encryption algorithm to determine a first-encrypted file; store the first-encrypted file in a local memory; encrypt the file based at least in part on utilizing a synchronization key and a second encryption algorithm to determine a second-encrypted file, the second encryption algorithm being different from the first encryption algorithm; encrypt metadata associated with the file based at least in part on utilizing a metadata key to determine encrypted metadata; and transmit, to a storage device, the second-encrypted file in association with the encrypted metadata.

In another aspect, the present disclosure contemplates a non-transitory computer readable medium storing instructions, which when executed by a processor cause the processor to: encrypt a file based at least in part on utilizing a file symmetric key and a first encryption algorithm to determine a first-encrypted file; store the first-encrypted file in a local memory; encrypt the file based at least in part on utilizing a synchronization key and a second encryption algorithm to determine a second-encrypted file, the second encryption algorithm being different from the first encryption algorithm; encrypt metadata associated with the file based at least in part on utilizing a metadata key to determine encrypted metadata; and transmit, to a storage device, the second-encrypted file in association with the encrypted metadata.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
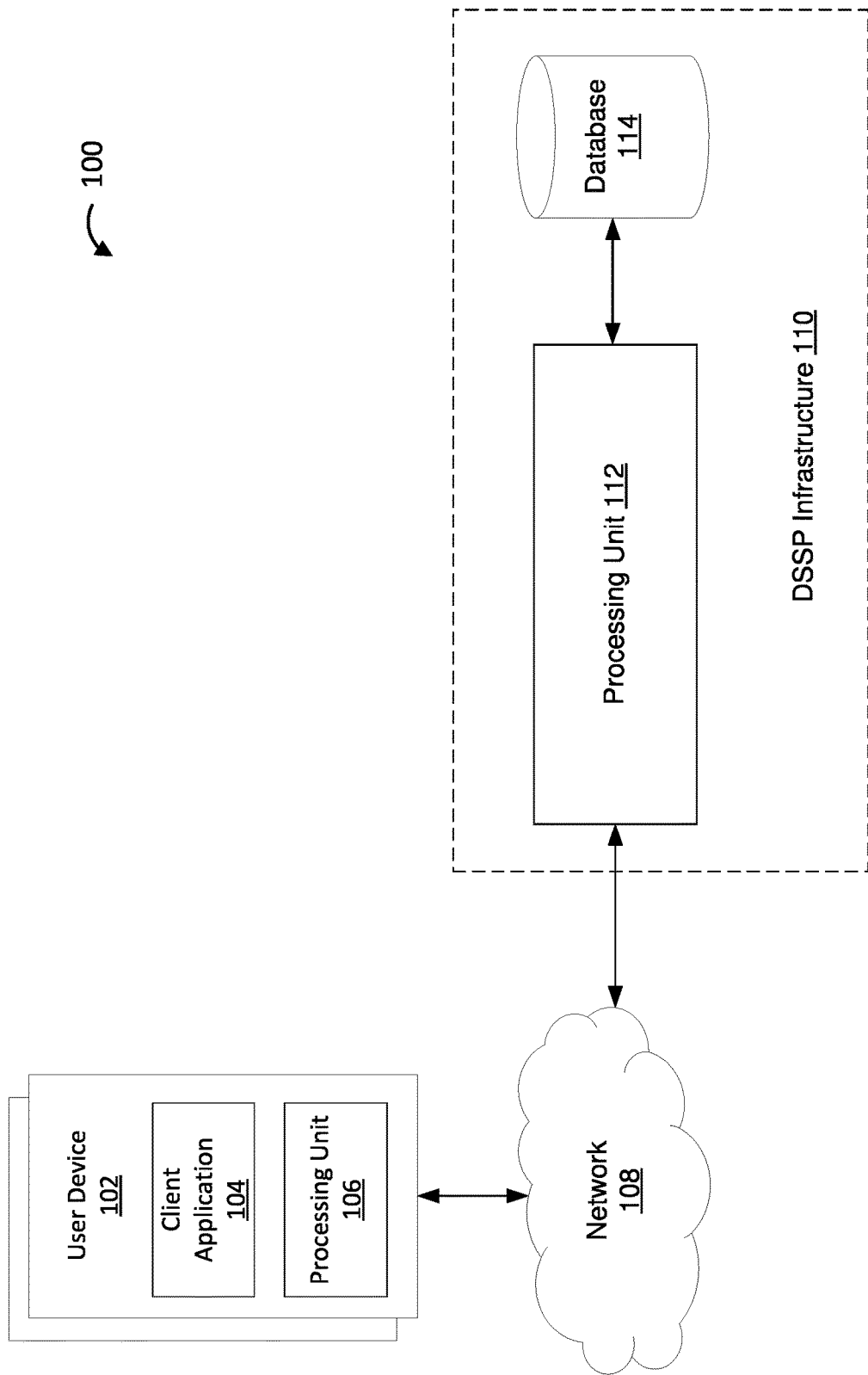

FIG. 1 is an illustration of an example system associated with secure synchronization of data, according to various aspects of the present disclosure.

Figure 2:
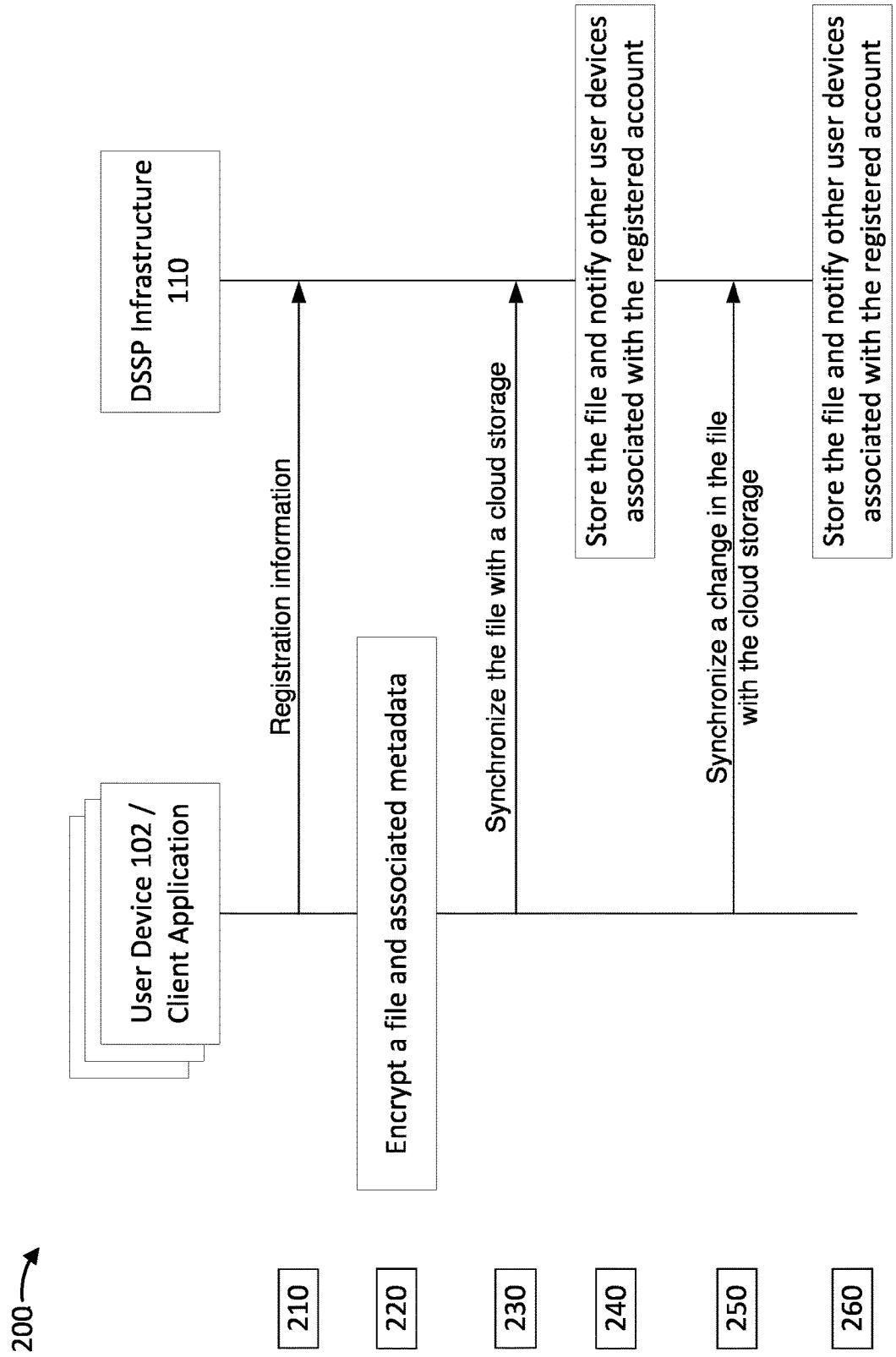

FIG. 2 is an illustration of an example flow associated with secure synchronization of data, according to various aspects of the present disclosure.

Figure 3:
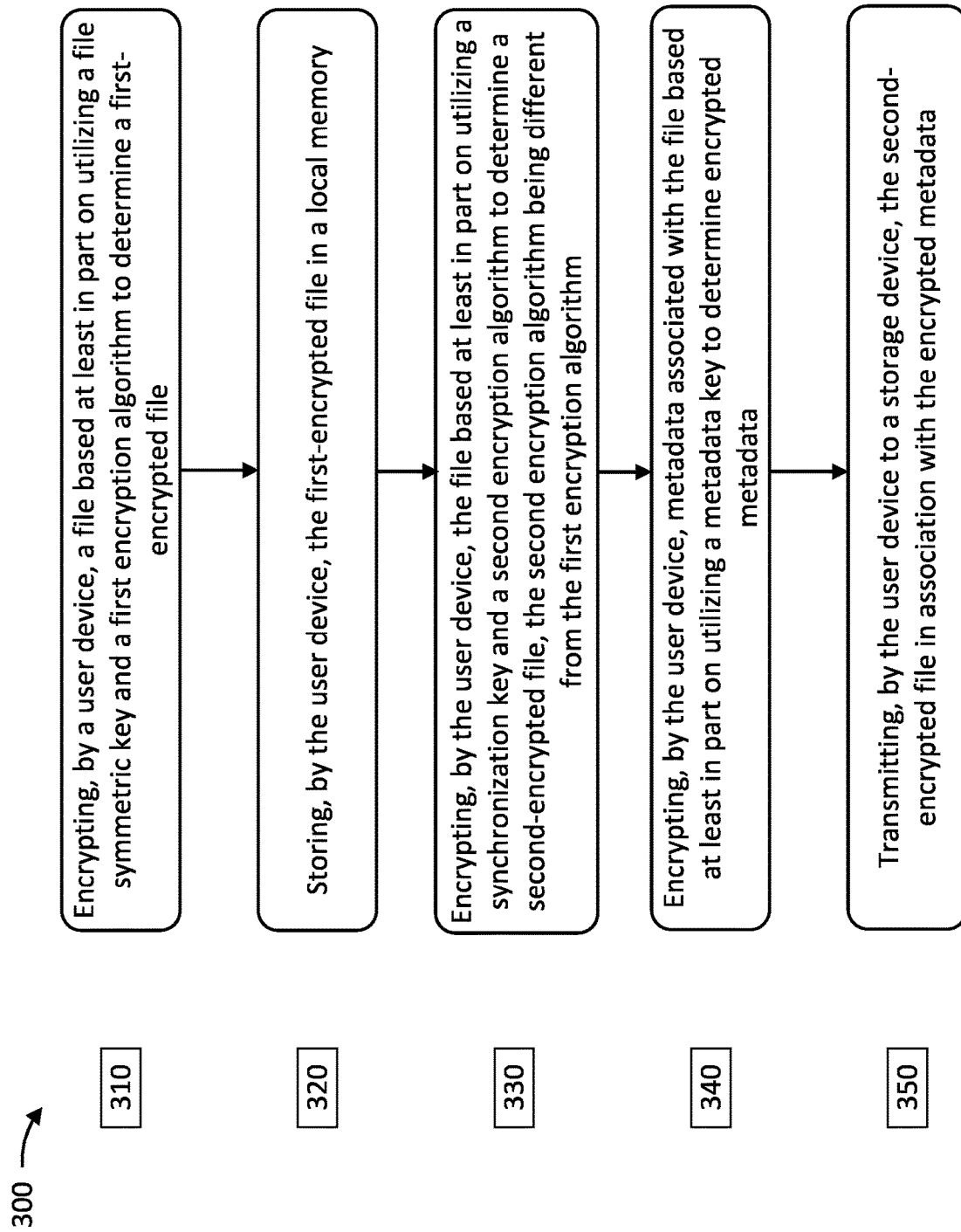

FIG. 3 is an illustration of an example process associated with secure synchronization of data, according to various aspects of the present disclosure.

Figure 4:
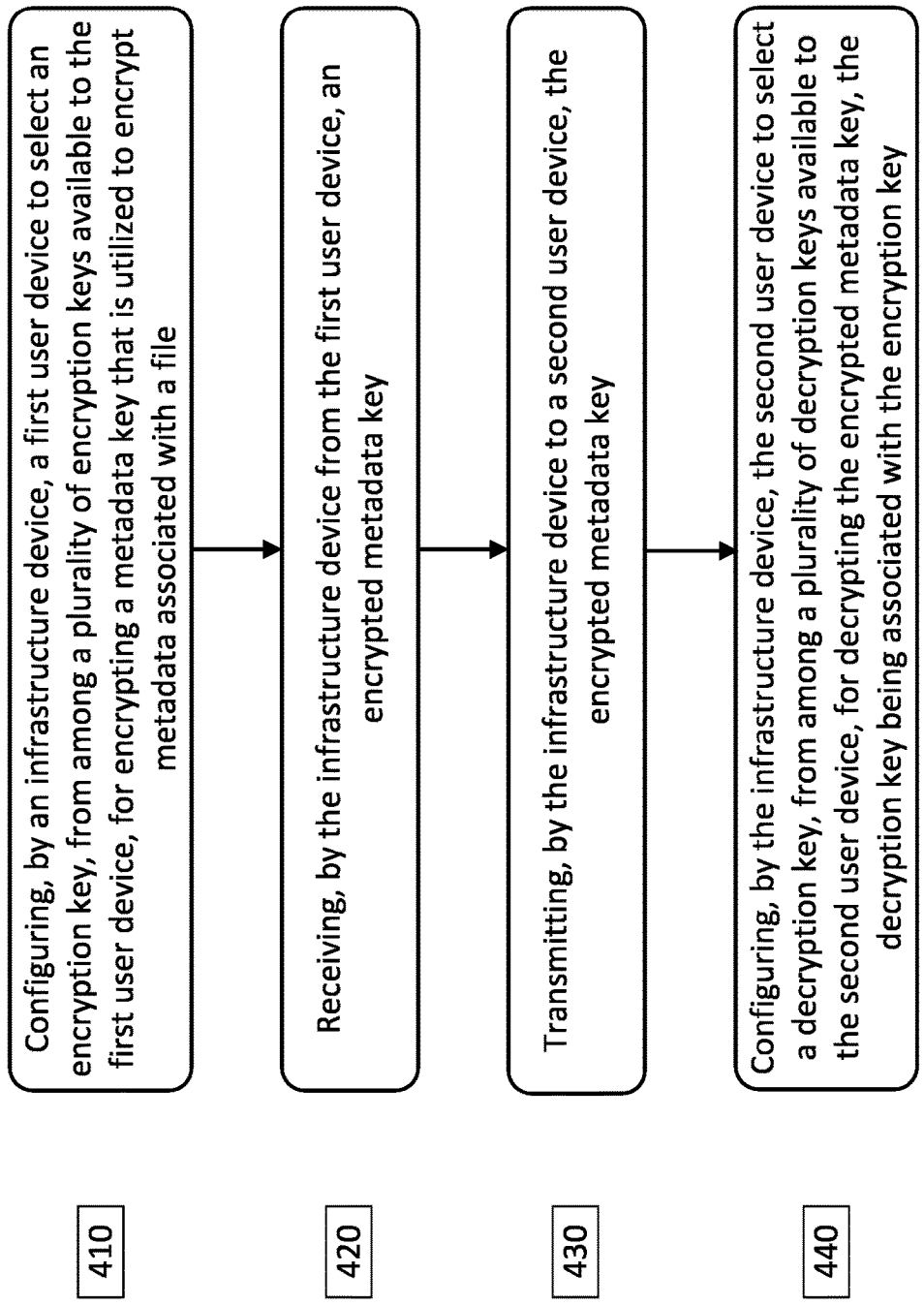

FIG. 4 is an illustration of an example process associated with secure synchronization of data, according to various aspects of the present disclosure.

Figure 5:
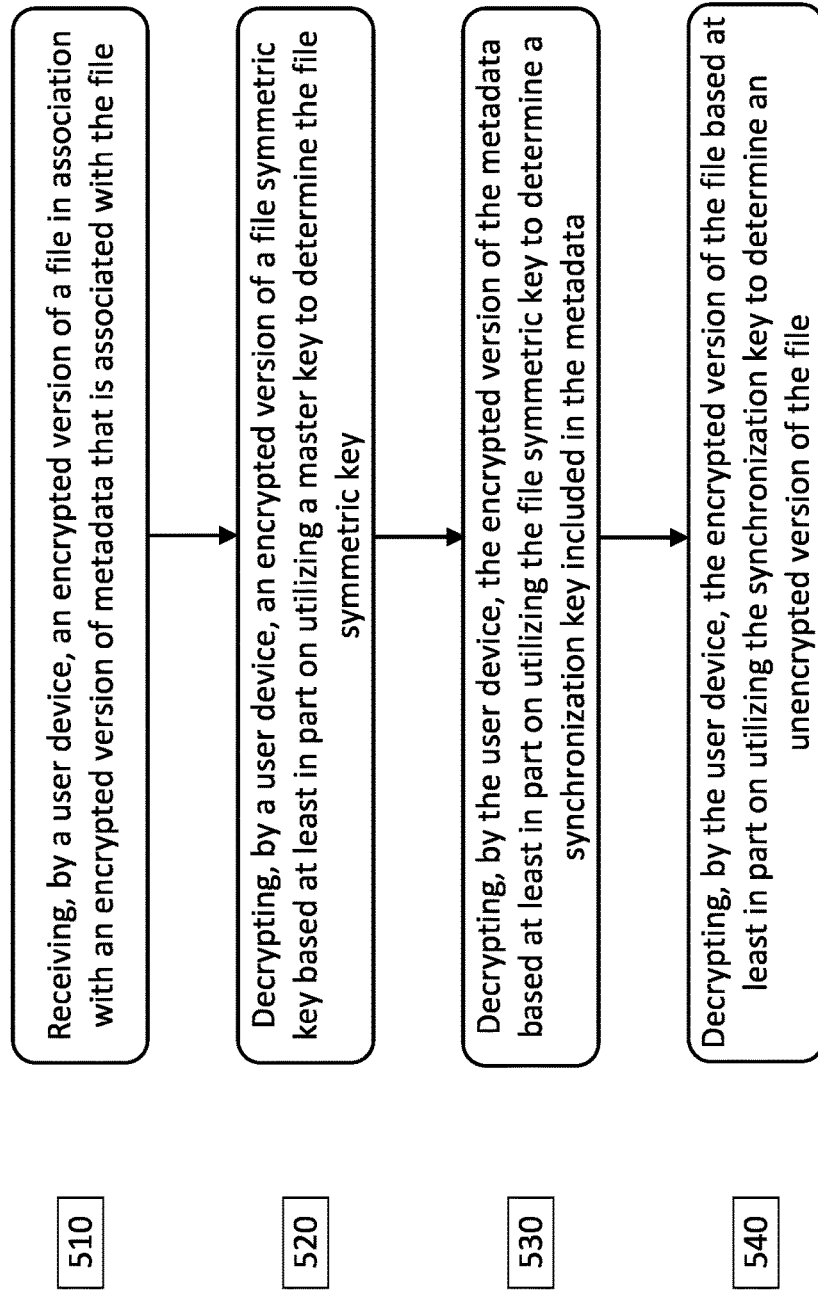

FIG. 5 is an illustration of an example process associated with secure synchronization of data, according to various aspects of the present disclosure.

Figure 6:
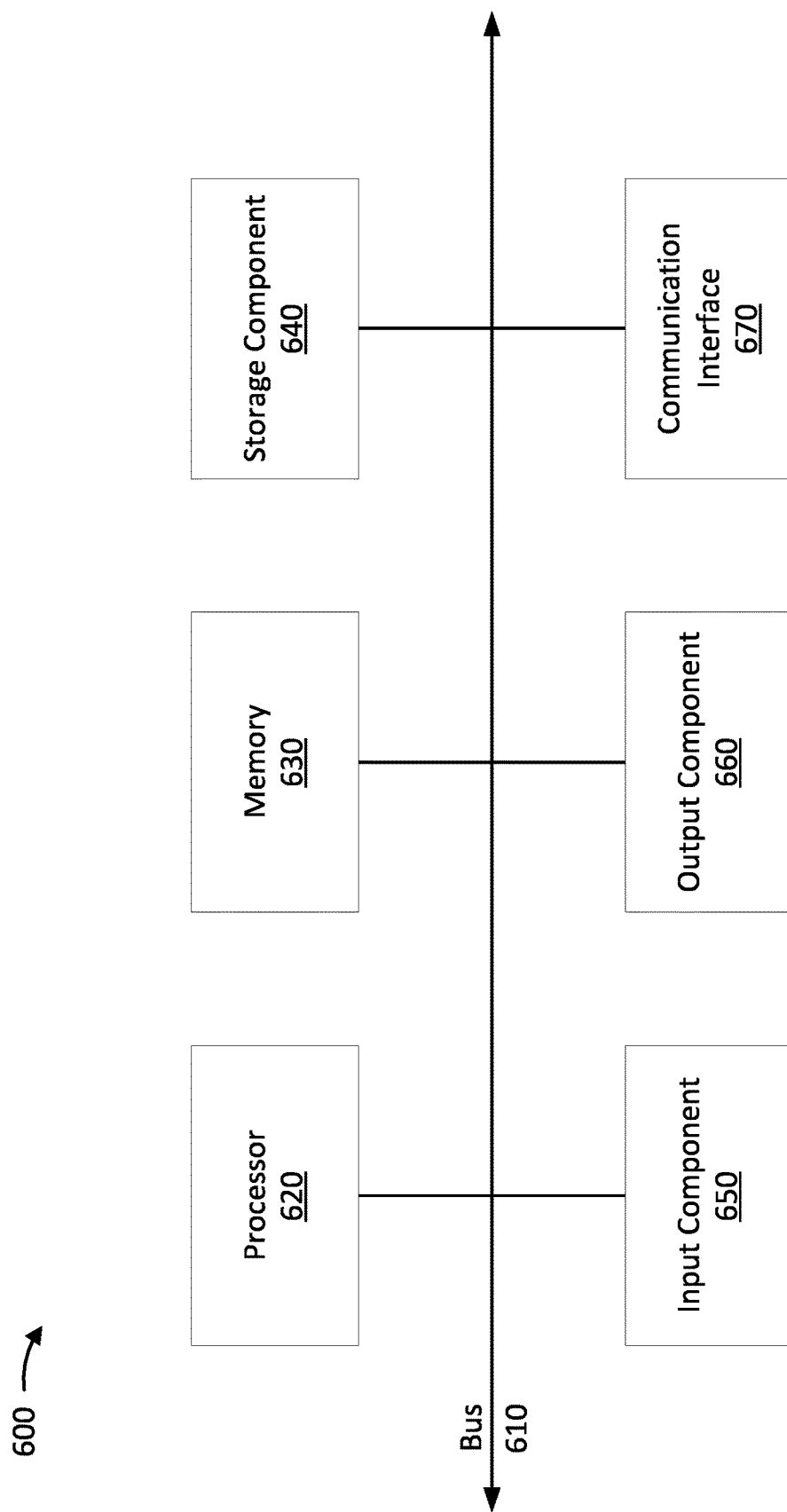

FIG. 6 is an illustration of example devices associated with secure synchronization of data, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with secure synchronization of data, according to various aspects of the present disclosure. The system 100 includes one or more user devices 102 communicating with a data storage service provider (DSSP) infrastructure 110 for purposes of receiving data storage and protection services, cyber security services, etc. A user device 102, from among the one or more user devices 102, may include an installed client application 104 and a processing unit 106. The DSSP infrastructure 110 may include a processing unit 112 and a database (e.g., memory) 114. In some aspects, the user device 102 may utilize the installed client application 104 to communicate with an application programming interface (API) (not shown) included in the DSSP infrastructure 110. In some aspects, the user device 102 and the DSSP infrastructure 110 may communicate with one another over a network 108.

The user device 102 may be a physical computing device capable of hosting a client application and of connecting to the network 108. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the DSSP infrastructure 110 may provide the user device 102 with the client application 104 to be installed on the user device 102. The client application 104 may enable a processor (e.g., processing unit 106, processor 620) associated with the user device 102 to securely synchronize data, which may include encryption and/or decryption. In some aspects, the client application 104 and/or the DSSP infrastructure 110 may utilize one or more encryption and decryption algorithms such as, for example, elliptic curve cryptography algorithms (e.g., Ed25519, X25519, etc.). The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, message digest and hashing algorithms (e.g., MD5, HMAC, etc.), or a combination thereof.

In some aspects, the data may include any information. For example, the information may include electronic information such as, for example, bank account numbers, credit card numbers, various passwords, or a combination thereof contained in, for example, files such as a photograph file containing a photograph and/or graphical data, a document file containing textual and/or graphical information, an audio file containing audio information, a video file containing audio-visual information, or a combination thereof.

The DSSP infrastructure 110 may include the processing unit 112 and the database 114. The processing unit 112 may include a logical component configured to perform complex operations to evaluate various factors associated with encrypting and decrypting the data. The database 114 may store various pieces of information associated with providing data storage and protection services including storing, for example, encrypted content and/or encrypted key information. In some aspects, the DSSP infrastructure 110 may include an application programming interface (API) (not shown) to communicate with the client application 104. The DSSP infrastructure 110 may include or be associated with a communication interface to communicate (e.g., transmit and/or receive) data.

The network 108 may be a wired or wireless network. In some aspects, the network 108 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 108 may include a digital telecommunication network that permits several nodes to share and access resources.

As indicated above, FIG. 1 is provided as an example. Other examples may differ from what is described with regard to FIG. 1.

A user device may request data storage services from a cloud service provider. Such data storage services may include cloud storage services that enable the user device to utilize, for example, the Internet to store data on cloud storage devices (e.g., remote servers, storage devices, or the like) managed by the cloud service provider. The data storage services may also be referred to as cloud backup services, online data storage services, online drive storages, file hosting services, file storage services, or the like. The cloud service provider may attempt to protect stored data by requiring the user device to provide credentials (e.g., username, password, one-time passwords, one-time tokens, or the like) to gain authorized access to the stored data. The data storage services may be available via use of a web interface and/or a client application interface.

In some instances, the cloud service provider may fail to protect the stored data. In an example, a malicious party may gain unauthorized access to the stored data by, for example, hacking into the cloud storage devices managed by the cloud service provider. In another example, internal devices associated with the cloud service provider that have access to the servers and/or storage devices managed by the cloud service provider may gain unauthorized access to the stored data. In yet another example, as part of the data storage services, the cloud service provider may enable the user device to synchronize a cloud storage with a local memory associated with the user device such that the data stored in the cloud storage is also stored in the local memory. In this case, upon synchronization, the user device may access the data via the local memory when, for example, the user device is unable to connect to the Internet or a server associated with the cloud storage may be out of service. During synchronization, the data may be communicated between the local memory and the cloud storage in unencrypted form, thereby allowing the malicious party to intercept and/or hack into the communicated data.

In such instances, an integrity associated with the stored data and/or the communicated data may be compromised. To restore the integrity of the stored data and/or the communicated data, the user device and/or the cloud service provider may expend resources (e.g., management resources, memory resources, computational/processing resources, power consumption resources, system bandwidth, network resources, etc.) that may otherwise be used for more suitable tasks associated with the data storage services.

Various aspects of systems and techniques discussed in the present disclosure enable secure synchronization of data. In some aspects, a DSSP may provide a stateless system including a DSSP infrastructure and/or a client application installed on a user device. The DSSP infrastructure may configure the client application to enable the secure synchronization of data. As discussed below in further detail with respect to FIG. 2, the client application may utilize cryptographic keys to encrypt and decrypt data that the user device may wish to protect. In an example, the client application may encrypt data, store the encrypted data in a cloud storage associated with the DSSP, and decrypt the encrypted data without the DSSP infrastructure having access to and/or storing unencrypted data or unencrypted cryptographic keys. As a result, even if a malicious party gains unauthorized access to the DSSP infrastructure, the unauthorized access may lead to encrypted data, which the malicious party may not be able to decrypt. Further, the client application may enable secure synchronization of data based at least in part on communicating the data in encrypted form between a local memory and the cloud storage. In addition to encrypting the data, the client application may also encrypt metadata (e.g., filename) associated with the data to avoid identification of the data by the malicious party. The client application and/or the DSSP infrastructure may employ a particular arrangement of cryptographic keys to encrypt and/or decrypt stored data and/or communicated data. Such particular arrangement of keys is critical because it enables the client application and/or the DSSP infrastructure to provide data storage services (e.g., protect stored data and communicated data) without storing unencrypted data and/or unencrypted keys. In this way, the client application and/or the DSSP infrastructure may mitigate instances of the data becoming compromised, thereby enabling efficient utilization of resources (e.g., management resources, memory resources, computational/processing resources, power consumption resources, system bandwidth, network resources, etc.) by the user device and/or by the DSSP infrastructure for more suitable tasks related to the data storage services.

In some aspects, a processor (e.g., processing unit 106, processor 620) associated with a user device and executing a client application may encrypt a file based at least in part on utilizing a file symmetric key and a first encryption algorithm to determine a first-encrypted file; store the first-encrypted file in a local memory; encrypt the file based at least in part on utilizing a synchronization key and a second encryption algorithm to determine a second-encrypted file, the second encryption algorithm being different from the first encryption algorithm; encrypt metadata associated with the file based at least in part on utilizing a metadata key to determine encrypted metadata; and transmit, to a storage device, the second-encrypted file in association with the encrypted metadata.

FIG. 2 is an illustration of an example flow 200 associated with secure synchronization of data, according to various aspects of the present disclosure. The example flow 200 may include one or more user devices 102 in communication with a DSSP infrastructure 110. In some aspects, each user device 102 may install a respective instance of a client application 104 configured and provided by the DSSP infrastructure 110 and may use the client application 104 to communicate with an application programming interface (API) and/or a processor (e.g., processing unit 112, processor 620) associated with the DSSP infrastructure 110. In some aspects, the one or more user devices 102 and the DSSP infrastructure may communicate over a network (e.g., network 108).

In some aspects, a client application 104 may enable a user device 102 to receive information to be processed by the client application 104 and/or by the DSSP infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration), the graphical interface for receiving the information. For instance, the client application 104 may cause a screen (e.g., local screen) associated with the user device 102 to display, for example, a pop-up message to request entry of the information. Further, the client application 104 may enable transmission of at least a portion of the information to the DSSP infrastructure 110. Additionally, as discussed below in further detail, the client application 104 may enable secure synchronization of data.

As shown by reference numeral 210, a first user device 102, from among the one or more user devices 102, may register an account with the DSSP infrastructure 110. During registration, the first user device 102 may provide registration information such as, for example, identity of an owner of the first user device 102, a phone number associated with the first user device 102, an email address associated with the first user device 102, or the like. In some aspects, the first user device 102 may set up an access system including, for example, username, password, or the like to subsequently gain access to the registered account. During the registration, the first user device 102 may also register and provide registration information associated with additional user devices (e.g., a second user device 102, etc.) that are to be associated with the registered account.

Based at least in part on completing the registration, the first client application 104 may request entry of and receive a master string of alphanumeric characters to be entered by utilizing an input interface associated with the first user device 102. In some aspects, the master string may be unique and be associated with the registered account associated with the first user device 102. Based at least in part on receiving the master string, the first client application 104 may determine a master key. In some aspects, the first client application 104 may utilize a password derivation function and/or a key derivation function to determine the master key based at least in part on the master string. In an example, the password derivation function and/or the key derivation function may perform password hashing on the master string to determine the master key. The first client application 104 may utilize the master key to encrypt and/or decrypt data and/or cryptographic keys associated with the registered account.

As shown by reference numeral 220, the first client application 104 may encrypt a file and associated metadata. In some aspects, the file may include, for example, a photograph file containing a photograph and/or graphical data, a document file containing textual and/or graphical information, an audio file containing audio information, a video file containing audio-visual information, or a combination thereof.

In some aspects, when a file is to be stored in a DSSP cloud storage associated with the registered account, the first client application 104 may create a first local folder in an associated memory (e.g., memory 630) of the first user device 102. In some aspects, contents may be stored in the first local folder in encrypted form by the first client application 104. To encrypt the file, the first client application 104 may determine a folder access key pair unique to the first local folder. In this way, the folder access key pair may be first local folder-specific. In other words, the first client application 104 may determine a respective folder access key pair for each local folder. The folder access key pair may include a folder access public key and a folder access private key associated with each other via, for example, a mathematical function. As a result, data encrypted using the folder access public key may be decrypted by utilizing the folder access private key.

Further, the first client application 104 may determine a file access key pair and a file symmetric key that are unique to the file to be encrypted and/or stored. In this way, the file access key pair and the file symmetric key may be file-specific. In other words, the first client application 104 may determine a respective file access key pair and a respective file symmetric key for each file stored in the first local folder. In some aspects, the first client application 104 may determine the file access key pair to include a file access public key and a file access private key. The file access public key and the file access private key may be associated with each other via, for example, a mathematical function. As a result, data encrypted using the file access public key may be decrypted by utilizing the file access private key. In some aspects, the first client application 104 may utilize a cryptographically secure pseudorandom bit generator (e.g., CSPRNG) to determine the file symmetric key. In this case, the file symmetric key may be a random key including a sequence of unpredictable and unbiased information.

To encrypt the file, the first client application 104 may utilize the keys and/or a first encryption algorithm (e.g., AES-GCM algorithm). In an example, the first client application 104 may encrypt the file based at least in part on utilizing the file symmetric key to determine a first-encrypted file. Also, the first client application 104 may encrypt the file symmetric key based at least in part on utilizing the file access public key. The first client application 104 may encrypt the file access private key based at least in part on utilizing the folder access public key. Further, the first client application 104 may encrypt the folder access private key based at least in part on utilizing the master key. In some aspects, the first encryption algorithm may utilize a first level of security (e.g., 128-bit encryption) to encrypt the file.

The first client application 104 may also encrypt a filename associated with the file. In some aspects, the filename may include information that uniquely identifies the file. In some aspects, the filename may include information that identifies a characteristic associated with the file. In an example, the characteristic may indicate a type associated with the file such as, for example, a document, a photograph, an audio file, a video file, or a combination thereof. In some aspects, the filename may include information that identifies and/or describes content contained in the file. To encrypt the filename, the first client application 104 may utilize a filename encryption key, derived based at least in part on utilizing the file symmetric key that was utilized to encrypt the file, and a filename encryption algorithm (e.g., AES-EME algorithm) that is different from the first encryption algorithm. In some aspects, the first client application may utilize a key derivation function (e.g., H-MAC-based key derivation function) and the file symmetric key to determine the filename encryption key. Based at least in part on encrypting the file and the filename, the first client application 104 may store the first-encrypted file in association with the encrypted filename in the first local folder.

By encrypting the filename, the first client application 104 may avoid a malicious party from identifying a characteristic associated with the file and/or content contained in the file. Further, it is critical for the first client application 104 to utilize the filename encryption algorithm to encrypt the filename, which is different from the first encryption algorithm utilized to first-encrypt the file, to make it more difficult for a malicious party to unauthorizedly decrypt the file and the filename utilizing a single algorithm. Similarly, it is critical for the first client application 104 to utilize the filename encryption key to encrypt the filename, which is different from the file symmetric key utilized to first-encrypt the file, to make it more difficult for a malicious party to unauthorizedly decrypt the file and the filename utilizing a single key.

Based at least in part on storing the first-encrypted file in the local folder, as shown by reference numeral 230, the first client application 104 may automatically synchronize the file with the DSSP cloud storage associated with the DSSP infrastructure 110. In some aspects, synchronizing the file with the cloud storage may include the first client application 104 encrypting the file a second time to determine a second-encrypted file and transmitting the second-encrypted file to the DSSP infrastructure 110.

In some aspects, to secure the synchronization, the first client application 104 may second-encrypt the file based at least in part on utilizing a synchronization key and a second encryption algorithm, which has a higher level of security (e.g., 256-bit encryption) with respect to the first encryption algorithm utilized to first-encrypt the file. In some aspects, the second encryption algorithm may have the higher level of security because the second-encrypted file is to be transmitted over a network (e.g., network 108) to the DS SP infrastructure 110. In some aspects, the first client application 104 may utilize a cryptographically secure pseudorandom bit generator (e.g., CSPRNG) to determine the synchronization key. In this case, the synchronization key may be a random key including a sequence of unpredictable and unbiased information.

Further, the first client application 104 may determine metadata associated with the file. In some aspects, the metadata may include metadata information such as, for example, the filename, the synchronization key, a hash of the content contained in the file, size information indicating a size of the file, file path information indicating information regarding the first local folder in which the file is stored, an initialization vector and/or an authentication tag indicating verification information associated with verifying whether the file has been tampered with, or a combination thereof. The first client application 104 may encrypt the metadata based at least in part on utilizing a metadata key and a metadata encryption algorithm. In some aspects, the first client application 104 may utilize a random bit generator to determine the metadata key. In this case, the metadata key may be a random key including a sequence of unpredictable and unbiased information.

By encrypting the metadata, the first client application 104 may avoid a malicious party from identifying metadata information associated with the file. Further, it is critical for the first client application 104 to utilize the metadata encryption algorithm to encrypt the metadata, which is different from the second encryption algorithm utilized to second-encrypt the file, to make it more difficult for a malicious party to unauthorizedly decrypt the file and the metadata utilizing a single algorithm. Similarly, it is critical for the first client application 104 to utilize the metadata key to encrypt the metadata, which is different from the synchronization key utilized to second-encrypt the file, to make it more difficult for a malicious party to unauthorizedly decrypt the file and the metadata utilizing a single key.

The first client application 104 may encrypt the metadata key based at least in part on utilizing the file symmetric key. In some aspects, the first client application 104 may be configured by the DSSP infrastructure 110 to encrypt the metadata key based at least in part on selecting and/or utilizing the file symmetric key to enable other instances of the client application installed on another device (e.g., second client application 104 installed on the second user device 102) associated with the registered account to decrypt the encrypted metadata key.

Based at least in part on determining the second-encrypted file and encrypting the metadata, the first client application 104 may synchronize the file with the cloud storage by transmitting the second-encrypted file in association with the encrypted metadata to the DSSP infrastructure 110. In some aspects, the first client application 104 may also transmit encrypted keys including the encrypted file symmetric key, encrypted file access private key, encrypted folder access private key, the encrypted metadata key, etc.

Based at least in part on receiving the second-encrypted file and the encrypted metadata, the DSSP infrastructure 110 may determine the registered account associated with the first user device 102. Further, the DSSP infrastructure 110 may determine a correlation between the second-encrypted file and the encrypted metadata based at least in part on receiving the second-encrypted file in association with the encrypted metadata. Further, as shown by reference numeral 240, the DSSP infrastructure 110 may store the second-encrypted file in correlation with the encrypted metadata in the cloud storage in association with the registered account associated with the first user device 102.

Based at least in part on storing the second-encrypted file in correlation with the encrypted metadata in association with the registered account, the DSSP infrastructure 110 may determine whether another user device (e.g., second user device, etc.) is associated with the registered account. In this case, the DSSP infrastructure 110 may determine that the second user device 102 is associated with the registered account. As a result, as further shown by reference numeral 240, the DSSP infrastructure 110 may transmit a notification to a second instance of the client application (e.g., second client application 104) installed on the second user device 102, the notification indicating that a new file has been synchronized with the cloud storage associated with the registered account. The notification may also indicate that the second-encrypted file and related data (e.g., encrypted metadata and/or the encrypted keys) are available for download.

Based at least in part on receiving the notification, the second client application 104 may download and/or receive the second-encrypted file, the encrypted metadata, and/or the encrypted keys. To decrypt the second-encrypted file and related data, the second client application 104 may request entry of the master string via an input interface associated with the second user device 102. Based at least in part on receiving the master string, the second client application 104 may determine the master key. Because the master key was utilized to encrypt the folder access private key, based at least in part on determining the master key, the second client application 104 may decrypt the encrypted folder access private key. The second client application 104 may decrypt the encrypted file access private key based at least in part on utilizing the folder access private key. In some aspects, the second client application 104 may utilize the association between the folder access private key and the folder access public key to decrypt the file access private key. Further, the second client application 104 may decrypt the file symmetric key based at least in part on utilizing the file access private key. In some aspects, the second client application 104 may utilize the association between the file access private key and the file access public key to decrypt the file symmetric key.

The second client application 104 may decrypt the encrypted metadata key based at least in part on utilizing the file symmetric key. In some aspects, the second client application may be configured by the DSSP infrastructure 110 to select and decrypt the encrypted metadata key based at least in part on utilizing the file symmetric key because the DSSP infrastructure 110 configured the metadata key to be encrypted based at least in part on utilizing the file symmetric key. In other words, the second client application may be configured by the DSSP infrastructure 110 to select and decrypt the encrypted metadata key based at least in part on utilizing the file symmetric key because the DSSP infrastructure 110 configured the first client application 104 to encrypt the metadata key based at least in part on utilizing the file symmetric key.

In some aspects, the DSSP infrastructure 110 may configure the metadata key to be encrypted based at least in part on utilization of another encryption key such as, for example, the master key, the folder access public key, the file access public key, etc. In this case, the DSSP infrastructure 110 may configure the second client application 104 to decrypt the encrypted metadata key based at least in part on utilizing a decryption key associated with the encryption key that was utilized to encrypt the metadata key.

The second client application 104 may decrypt the encrypted metadata based at least in part on utilizing the metadata key. In this case, the second client application 104 may determine the metadata information including, for example, the filename, the synchronization key, the hash of the content contained in the file, the size information indicating the size of the file, file path information indicating information regarding the first folder in which the file is stored, the initialization vector and/or the authentication tag indicating the verification information associated with verifying whether the file has been tampered with during transmission, or a combination thereof.

Based at least in part on determining the metadata information, the second client application 104 may utilize the authentication tag to determine whether the file had been tampered with during transmission of the second-encrypted file from the first user device 102 to the DSSP infrastructure 110 and/or during reception of the second-encrypted file from the DSSP infrastructure 110 to the second user device 102. When the second client application 104 determines that the second-encrypted file was not tampered with, the second client application 104 may utilize the file path information to create a second folder in a memory associated with the second user device 102, the second folder having a similar and/or analogous file path as the first local folder on the first memory associated with the first user device 102.

Further, the second client application 104 may decrypt the second-encrypted file based at least in part on utilizing the synchronization key to determine the file. The second client application 104 may first-encrypt the file in a similar and/or analogous manner as the first client application first-encrypted the file. Further, the second client application may store the first-encrypted file in a second local folder in a memory associated with the second user device 102. The second client application 104 may also associate the filename with the first-encrypted file. When the first-encrypted file is to be decrypted, the second client application 104 may decrypt the first-encrypted file based at least in part on utilizing the file symmetric key. In this way, a new file may be synchronized among the user devices 102 associated with the registered account and the DS SP infrastructure 110.

In some aspects, as shown by reference numeral 250, the first client application 104 may automatically synchronize a change in the file stored in the first local folder with the cloud storage associated with the DSSP infrastructure 110. In some aspects, when content contained in the file is to be changed and/or modified, the first client application 104 may access the first-encrypted file stored in the first local folder. Further, the first client application 104 may decrypt the first-encrypted file. In an example, the first client application 104 may utilize the file symmetric key to decrypt the first-encrypted file. In some aspects, the first client application 104 may request entry of the master string prior to decrypting the first-encrypted file.

After a change or a modification to the content of the file is completed, the first client application 104 may encrypt and store a modified first-encrypted file in the first local folder. In an example, the first client application 104 may determine the modified first-encrypted file in a similar and/or analogous manner as discussed previously (e.g., block 220). Further, the first client application 104 may synchronize the modified first-encrypted file with the cloud storage based at least in part on determining a modified second-encrypted file and/or modified encrypted metadata and/or encrypted keys in a similar and/or analogous manner as discussed previously (e.g., block 230). In some aspects, the first client application 104 may determine and utilize a new file symmetric key different from the previously utilized file symmetric key, a new synchronization key different from the previously utilized synchronization key, and/or a new metadata key different from the previously utilized metadata key. Utilizing new keys is critical with respect to securing synchronization of the modified file.

Based at least in part on receiving the modified second-encrypted file and/or the modified encrypted metadata and/or the encrypted keys, in a similar and/or analogous manner as discussed previously (e.g., block 240), as shown by reference numeral 260, the DSSP infrastructure 110 may store the modified second-encrypted file and/or the modified encrypted metadata and/or the encrypted keys in association with the registered account and may notify other user devices associated with the registered account that the content in the file has been changed and/or modified, as discussed previously. In this case, the DSSP infrastructure 110 may optionally discard the previously stored second-encrypted file and/or the encrypted metadata and/or the encrypted keys in association with the registered account.

Based at least in part on receiving the notification, the second client application 104 may download and/or receive the modified second-encrypted file, the modified encrypted metadata, and/or the encrypted keys in a similar and/or analogous manner, as discussed previously. Further, the second client application 104 may determine modified metadata information in a similar and/or analogous manner as discussed previously. When the content in the file has been changed and/or modified, the second client application 104 may additionally calculate a hash of the content in the file stored in the second local folder. Further, the second client application 104 may compare the calculated hash with the hash received in the modified metadata information. When the second client application 104 determines that the calculated hash matches (e.g., is the same as) the received hash, the second client application 104 determines that the file stored in the second local folder already includes the changes and/or modifications to the content. Alternatively, when the second client application 104 determines that the calculated hash fails to match (e.g., is different from) the received hash, the second client application 104 may determine that the file stored in the second local folder fails to include the changes and/or modifications to the content. In this case, the second client application 104 may decrypt the modified second-encrypted file in a similar and/or analogous manner, as discussed previously. Further, the second client application 104 may store the modified file in the second local folder. Based at least in part on storing the modified file in the second local folder, the second client application 104 may optionally discard the previously stored file in the second local folder.

In some aspects, the synchronization of the change in the file discussed above with respect to reference numeral 250 may be performed by the second client application 104 when the file is changed and/or modified using the second user device 102. In this case, the notification from the DSSP infrastructure may be received by the first client application 104, which may perform the decryption and storing of the modified file, as discussed above.

In this way, by utilizing the above techniques to enable secure synchronization of data based at least in part on communicating the data in encrypted form between a local folder and the cloud storage, and by encrypting a name that identifies the data to avoid identification of the data by the malicious party, the client application and/or the DSSP infrastructure may mitigate instances of the data becoming compromised. Further, by utilizing the above critical arrangement of keys, the DSSP infrastructure 110 may enable the client application 104 and/or the DSSP infrastructure 110 to provide data storage services (e.g., protect data) without having access to and/or storing unencrypted content. For instance, the DSSP infrastructure 110 may not have access to and/or store information such as the master string, the master key, folder access key pair, file access key pair, file symmetric key, synchronization key, metadata key, file, content in the file, etc. may not be stored in unencrypted form. As a result, efficient utilization of resources (e.g., management resources, memory resources, computational/processing resources, power consumption resources, system bandwidth, network resources, etc.) may be enabled by the user device and/or by the DSSP infrastructure for more suitable tasks related to the data storage services.

As indicated above, FIG. 2 is provided as an example. Other examples may differ from what is described with regard to FIG. 2.

FIG. 3 is an illustration of an example process 300 associated with secure synchronization of data, according to various aspects of the present disclosure. In some aspects, the process 300 may be performed by a memory and/or a processor/controller (e.g., processing unit 106, processor 620) associated with a user device (e.g., user device 102) executing a client application. As shown by reference numeral 310, process 300 may include encrypting, by a user device, a file based at least in part on utilizing a file symmetric key and a first encryption algorithm to determine a first-encrypted file. For instance, the user device may utilize the associated processor/controller to encrypt a file based at least in part on utilizing a file symmetric key and a first encryption algorithm to determine a first-encrypted file, as discussed elsewhere herein.

As shown by reference numeral 320, process 300 may include storing, by the user device, the first-encrypted file in a local memory. For instance, the user device may utilize the associated processor/controller to store the first-encrypted file in a local memory.

As shown by reference numeral 330, process 300 may include encrypting, by the user device, the file based at least in part on utilizing a synchronization key and a second encryption algorithm to determine a second-encrypted file, the second encryption algorithm being different from the first encryption algorithm. For instance, the user device may utilize the associated processor/controller to encrypt the file based at least in part on utilizing a synchronization key and a second encryption algorithm to determine a second-encrypted file, the second encryption algorithm being different from the first encryption algorithm, as discussed elsewhere herein.

As shown by reference numeral 340, process 300 may include encrypting, by the user device, metadata associated with the file based at least in part on utilizing a metadata key to determine encrypted metadata. For instance, the user device may utilize the associated processor/controller to encrypt metadata associated with the file based at least in part on utilizing a metadata key to determine encrypted metadata, as discussed elsewhere herein.

As shown by reference numeral 350, process 300 may include transmitting, by the user device to a storage device, the second-encrypted file in association with the encrypted metadata. For instance, the user device may utilize a communication interface (e.g., communication interface 670) with the associated processor/controller to transmit, to a storage device, the second-encrypted file in association with the encrypted metadata, as discussed elsewhere herein.

Process 300 may include additional aspects, such as any single aspect or any combination of aspects described below and/or in connection with one or more other processes described elsewhere herein.

In a first aspect, process 300 may include encrypting a filename that identifies the file; and associating the first-encrypted file with the encrypted filename.

In a second aspect, alone or in combination with the first aspect, process 300 may include encrypting a filename, which identifies the file, based at least in part on utilizing a filename encryption key that is derived from the file symmetric key.

In a third aspect, alone or in combination with the first through second aspects, process 300 may include determining the metadata to include the synchronization key and a hash of content included in the file.

In a fourth aspect, alone or in combination with the first through third aspects, process 300 may include determining the metadata to include an authentication tag to enable verifying whether the file has been tampered with during the transmitting.

In a fifth aspect, alone or in combination with the first through fourth aspects, in process 300, transmitting the second-encrypted file in association with the encrypted metadata includes transmitting encrypted keys including an encrypted file symmetric key and an encrypted metadata key.

In a sixth aspect, alone or in combination with the first through fifth aspects, process 300 may include encrypting the file symmetric key based at least in part on utilizing a master key that is determined based at least in part on a master string of alphanumeric characters.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with secure synchronization of data, according to various aspects of the present disclosure. In some aspects, the process 400 may be performed by a memory and/or a processor/controller (e.g., processing unit 112, processor 620) associated with a DSSP infrastructure (e.g., DSSP infrastructure 110). As shown by reference numeral 410, process 400 may include configuring, by an infrastructure device, a first user device to select an encryption key, from among a plurality of encryption keys available to the first user device, for encrypting a metadata key that is utilized to encrypt metadata associated with a file. For instance, the DSSP infrastructure may utilize the associated memory and processor to configure a first user device to select an encryption key, from among a plurality of encryption keys available to the first user device, for encrypting a metadata key that is utilized to encrypt metadata associated with a file, as discussed elsewhere herein.

As shown by reference numeral 420, process 400 may include receiving, by the infrastructure device from the first user device, an encrypted metadata key. For instance, DSSP infrastructure may utilize an associated communication interface (e.g., communication interface 670) with the associated memory and processor to receive, from the first user device, an encrypted metadata key, as discussed elsewhere herein.

As shown by reference numeral 430, process 400 may include transmitting, by the infrastructure device to a second user device, the encrypted metadata key. For instance, the DSSP infrastructure may utilize the associated communication interface, memory, and processor to transmit, to a second user device, the encrypted metadata key, as discussed elsewhere herein.

As shown by reference numeral 440, process 400 may include configuring, by the infrastructure device, the second user device to select a decryption key, from among a plurality of decryption keys available to the second user device, for decrypting the encrypted metadata key, the decryption key being associated with the encryption key. For instance, the DSSP infrastructure may utilize the associated memory and processor to configure the second user device to select a decryption key, from among a plurality of decryption keys available to the second user device, for decrypting the encrypted metadata key, the decryption key being associated with the encryption key, as discussed elsewhere herein.

Process 400 may include additional aspects, such as any single aspect or any combination of aspects described below and/or in connection with one or more other processes described elsewhere herein.

In a first aspect, in process 400, the plurality of encryption keys includes one or more encryption keys associated with encrypting the file.

In a second aspect, alone or in combination with the first aspect, in process 400, the metadata includes at least one encryption key utilized to encrypt the file.

In a third aspect, alone or in combination with the first through second aspects, in process 400, receiving the encrypted metadata key includes receiving the encrypted metadata key in association with an encrypted version of the file.

In a fourth aspect, alone or in combination with the first through third aspects, in process 400, transmitting the encrypted metadata key includes transmitting the encrypted metadata key in association with an encrypted version of the file.

In a fifth aspect, alone or in combination with the first through fourth aspects, process 400 may include determining that the encrypted metadata key is to be transmitted to the second user device based at least in part on determining an association between the first user device and the second user device.

In a sixth aspect, alone or in combination with the first through fifth aspects, process 400 may include transmitting, to the second user device based at least in part on receiving the encrypted metadata key, a notification indicating that the encrypted metadata key is available to the second user device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with secure synchronization of data, according to various aspects of the present disclosure. In some aspects, the process 500 may be performed by a memory and/or processor/controller (e.g., processing unit 106, processor 620) associated with a user device (e.g., user device 102) executing a respective client application. As shown by reference numeral 510, process 500 may include receiving, by a user device, an encrypted version of a file in association with an encrypted version of metadata that is associated with the file. For instance, the user device may utilize an associated communication interface (e.g., communication interface 670) with the associated processor/controller to receive an encrypted version of a file in association with an encrypted version of metadata that is associated with the file, as discussed elsewhere herein.

As shown by reference numeral 520, process 500 may include decrypting, by a user device, an encrypted version of a file symmetric key based at least in part on utilizing a master key to determine the file symmetric key. For instance, the user device may utilize the associated processor/controller to decrypt an encrypted version of a file symmetric key based at least in part on utilizing a master key to determine the file symmetric key, as discussed elsewhere herein.

As shown by reference numeral 530, process 500 may include decrypting, by the user device, the encrypted version of the metadata based at least in part on utilizing the file symmetric key to determine a synchronization key included in the metadata. For instance, the user device may utilize the associated processor/controller to decrypt the encrypted version of the metadata based at least in part on utilizing the file symmetric key to determine a synchronization key included in the metadata, as discussed elsewhere herein.

As shown by reference numeral 540, process 500 may include decrypting, by the user device, the encrypted version of the file based at least in part on utilizing the synchronization key to determine an unencrypted version of the file. For instance, the user device may utilize the associated processor/controller to decrypt the encrypted version of the file based at least in part on utilizing the synchronization key to determine an unencrypted version of the file, as discussed elsewhere herein.

Process 500 may include additional aspects, such as any single aspect or any combination of aspects described below and/or in connection with one or more other processes described elsewhere herein.

In a first aspect, process 500 may include determining the master key based at least in part on a master string of alphanumeric characters.

In a second aspect, alone or in combination with the first aspect, in process 500, decrypting the encrypted version of the metadata includes utilizing the file symmetric key to decrypt an encrypted version of a metadata key, and utilizing the metadata key to decrypt the encrypted version of the metadata.

In a third aspect, alone or in combination with the first through second aspects, process 500 may include determining a calculated hash of a stored version of the file stored in a memory associated with the user device, and comparing the calculated hash with a received hash of the unencrypted version of the file included in the metadata to determine whether the stored version of the file matches the unencrypted version of the file.

In a fourth aspect, alone or in combination with the first through third aspects, process 500 may include determining that the unencrypted version of the file includes a modification based at least in part on comparing the unencrypted version of the file with a stored version of the file stored in a memory associated with the user device.

In a fifth aspect, alone or in combination with the first through fourth aspects, process 500 may include storing the unencrypted version of the file in a folder in a memory associated with the user device based at least in part on path information included in the metadata.

In a sixth aspect, alone or in combination with the first through fifth aspects, process 500 may include determining whether the unencrypted version of the file was tampered with based at least in part on information included in the metadata.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600, according to various aspects of the present disclosure. In some aspects, the example devices 600 may form part of or implement the systems, environments, infrastructures, components, or the like described elsewhere herein (e.g., FIG. 1 and/or FIG. 2) and may be used to perform the example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    configuring, by an infrastructure device, a first user device to select an encryption key, from among a plurality of encryption keys generated by the first user device and available to the first user device, for encrypting a metadata key that is utilized to encrypt metadata associated with a file, the plurality of encryption keys being determined by the first user device;
    receiving, by the infrastructure device from the first user device, an encrypted metadata key;
    transmitting, by the infrastructure device to a second user device, the encrypted metadata key; and
    configuring, by the infrastructure device, the second user device to select a decryption key for decrypting the encrypted metadata key, the decryption key being selected from among a plurality of decryption keys that are available for decrypting the encrypted metadata key, and the decryption key being associated with the encryption key.

2. The method of claim 1, wherein the plurality of encryption keys includes one or more encryption keys associated with encrypting the file.

3. The method of claim 1, wherein the metadata includes at least one encryption key utilized to encrypt the file.

4. The method of claim 1, wherein receiving the encrypted metadata key includes receiving the encrypted metadata key in association with an encrypted version of the file.

5. The method of claim 1, wherein configuring the second user device to select the decryption key, which is associated with the encryption key, includes configuring the second user device to select the decryption key based at least in part on determining that the first user device and the second user device are associated with a single account registered with the infrastructure device.

6. The method of claim 1, further comprising:
    determining that the encrypted metadata key is to be transmitted to the second user device based at least in part on determining an association between the first user device and the second user device.

7. The method of claim 1, further comprising:
    transmitting, to the second user device based at least in part on receiving the encrypted metadata key, a notification indicating that the encrypted metadata key is available to the second user device.

8. An infrastructure device, comprising:
    a memory; and
    a processor communicatively coupled to the memory, the memory and the processor being configured to:
        configure a first user device to select an encryption key, from among a plurality of encryption keys generated by the first user device and available to the first user device, for encrypting a metadata key that is utilized to encrypt metadata associated with a file, the plurality of encryption keys being determined by the first user device;
        receive, from the first user device, an encrypted metadata key;
        transmit, to a second user device, the encrypted metadata key; and
        configure the second user device to select a decryption key for decrypting the encrypted metadata key, the decryption key being selected from among a plurality of decryption keys that are available for decrypting the encrypted metadata key, and the decryption key being associated with the encryption key.

9. The infrastructure device of claim 8, wherein the plurality of encryption keys includes one or more encryption keys associated with encrypting the file.

10. The infrastructure device of claim 8, wherein the metadata includes at least one encryption key utilized to encrypt the file.

11. The infrastructure device of claim 8, wherein, to receive the encrypted metadata key, the memory and the processor are configured to receive the encrypted metadata key in association with an encrypted version of the file.

12. The infrastructure device of claim 8, wherein, to configure the second user device to select the decryption key, which is associated with the encryption key, the memory and the processor are configured to configure the second user device to select the decryption key based at least in part on determining that the first user device and the second user device are associated with a single account registered with the infrastructure device.

13. The infrastructure device of claim 8, wherein the memory and the processor are configured to determine that the encrypted metadata key is to be transmitted to the second user device based at least in part on determining an association between the first user device and the second user device.

14. The infrastructure device of claim 8, wherein the memory and the processor are configured to transmit, to the second user device based at least in part on receiving the encrypted metadata key, a notification indicating that the encrypted metadata key is available to the second user device.

15. A non-transitory computer-readable medium configured to store instructions, which when executed by a processor associated with an infrastructure device, configure the processor to:
configure a first user device to select an encryption key, from among a plurality of encryption keys generated by the first user device and available to the first user device, for encrypting a metadata key that is utilized to encrypt metadata associated with a file, the plurality of encryption keys being determined by the first user device;
receive, from the first user device, an encrypted metadata key;
transmit, to a second user device, the encrypted metadata key; and
configure the second user device to select a decryption key for decrypting the encrypted metadata key, the decryption key being selected from among a plurality of decryption keys that are available for decrypting the encrypted metadata key, and the decryption key being associated with the encryption key.

16. The non-transitory computer-readable medium of claim 15, wherein the plurality of encryption keys includes one or more encryption keys associated with encrypting the file.

17. The non-transitory computer-readable medium of claim 15, wherein the metadata includes at least one encryption key utilized to encrypt the file.

18. The non-transitory computer-readable medium of claim 15, wherein, to receive the encrypted metadata key, the processor is configured to receive the encrypted metadata key in association with an encrypted version of the file.

19. The non-transitory computer-readable medium of claim 15, wherein, to configure the second user device to select the decryption key, which is associated with the encryption key, the processor is configured to configure the second user device to select the decryption key based at least in part on determining that the first user device and the second user device are associated with a single account registered with the infrastructure device.

20. The non-transitory computer-readable medium of claim 15, wherein the processor is configured to determine that the encrypted metadata key is to be transmitted to the second user device based at least in part on determining an association between the first user device and the second user device.

* * * * *